DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 453

T905,007

PROCESS FOR CLEANING GOLD ALLOYS

Rajnikant Babubhai Amin, Wilmington, and Rudolph John Bacher, New Castle, Del., assignors to E. I. du Pont de Nemours and Company, Wilmington, Del.

Filed Dec. 16, 1971, Ser. No. 208,979

Int. Cl. C23f *3/04*

U.S. Cl. 134—41

No Drawing. 9 Pages Specification

A process for the cleaning of alloys of gold with minor amounts of tin, silicon, indium, germanium or antimony by treatment with decomposable halogen compounds at elevated temperatures below the melting temperatures of the alloys. Ammonium chloride and glutamic acid hydrochloride are particularly desirable.